(12) United States Patent
Aminaka et al.

(10) Patent No.: US 10,778,324 B2
(45) Date of Patent: Sep. 15, 2020

(54) D2D COMMUNICATION CONTROL APPARATUS, RADIO TERMINAL, RELAY RADIO TERMINAL CANDIDATE SELECTION METHOD, AND NON-TRANSITORY COMPUTER READABLE MEDIUM

(71) Applicant: NEC Corporation, Tokyo (JP)

(72) Inventors: Hiroaki Aminaka, Tokyo (JP); Kazushi Muraoka, Tokyo (JP); Taichi Ohtsuji, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/736,165

(22) PCT Filed: Feb. 10, 2016

(86) PCT No.: PCT/JP2016/000710
§ 371 (c)(1),
(2) Date: Dec. 13, 2017

(87) PCT Pub. No.: WO2016/208098
PCT Pub. Date: Dec. 29, 2016

(65) Prior Publication Data
US 2018/0159616 A1 Jun. 7, 2018

(30) Foreign Application Priority Data
Jun. 25, 2015 (JP) .................................. 2015-127781

(51) Int. Cl.
*H04B 7/155* (2006.01)
*H04B 7/26* (2006.01)
(Continued)

(52) U.S. Cl.
CPC ....... *H04B 7/15585* (2013.01); *H04B 7/2606* (2013.01); *H04W 8/005* (2013.01);
(Continued)

(58) Field of Classification Search
None
See application file for complete search history.

(56) References Cited

U.S. PATENT DOCUMENTS

2006/0153105 A1* 7/2006 Jia .......................... H04W 76/14
370/278
2011/0258313 A1* 10/2011 Mallik .................. H04W 8/005
709/224

(Continued)

FOREIGN PATENT DOCUMENTS

| WO | 2014/057709 A1 | 4/2014 |
|---|---|---|
| WO | 2015/045860 A1 | 4/2015 |

OTHER PUBLICATIONS

3GPP TS 23.303 V12.4.0, "3rd Generation Partnership Project; Technical Specification Group Services and System Aspects; Proximity-based services (ProSe); Stage 2 (Release 12)", Mar. 2015, pp. 1-63.
(Continued)

*Primary Examiner* — Robert C Scheibel
*Assistant Examiner* — Gautam Sharma
(74) *Attorney, Agent, or Firm* — Sughrue Mion, PLLC

(57) ABSTRACT

A D2D communication control apparatus (10) according to the present invention includes: a communication unit (11) configured to receive determination information that can be used to determine whether each of a plurality of radio terminals is capable of performing device-to-device (D2D) communication with another radio terminal; and a selection unit (12) configured to select, using the determination information between radio terminals that may operate as relay radio terminals, a candidate for a relay radio terminal that
(Continued)

relays the communication between one of the plurality of radio terminals and a network, the relay radio terminal candidate transmitting a response signal in response to a first discovery signal transmitted from one of the radio terminals by performing D2D communication with the one of the plurality of radio terminals and performing cellular communication with the network.

11 Claims, 14 Drawing Sheets

(51) Int. Cl.
    *H04W 84/18*     (2009.01)
    *H04W 92/18*     (2009.01)
    *H04W 8/00*     (2009.01)
    *H04W 8/08*     (2009.01)
    *H04W 76/14*     (2018.01)
    *H04W 88/04*     (2009.01)

(52) U.S. Cl.
    CPC ............. *H04W 8/08* (2013.01); *H04W 84/18* (2013.01); *H04W 92/18* (2013.01); *H04W 76/14* (2018.02); *H04W 88/04* (2013.01)

(56) References Cited

U.S. PATENT DOCUMENTS

| | | | | |
|---|---|---|---|---|
| 2012/0155406 A1* | 6/2012 | Kim | ......................... | H04W 4/70 370/329 |
| 2013/0148564 A1* | 6/2013 | Yu | ......................... | H04W 8/186 370/312 |
| 2014/0029471 A1* | 1/2014 | Tavildar | ................. | H04W 48/16 370/255 |
| 2014/0171062 A1* | 6/2014 | Fallgren | ................. | H04W 40/22 455/422.1 |
| 2014/0206322 A1* | 7/2014 | Dimou | .................. | H04W 76/14 455/414.1 |
| 2014/0328310 A1* | 11/2014 | Xu | ........................... | H04W 4/80 370/329 |
| 2014/0328329 A1* | 11/2014 | Novlan | ................ | H04W 72/042 370/336 |
| 2014/0329535 A1 | 11/2014 | Sadiq et al. | | |
| 2015/0036519 A1* | 2/2015 | Kazmi | .............. | H04W 72/1278 370/252 |
| 2015/0038136 A1* | 2/2015 | Wu | ......................... | H04W 48/08 455/434 |
| 2015/0119055 A1* | 4/2015 | Shin | ....................... | H04W 8/005 455/450 |
| 2015/0215028 A1* | 7/2015 | Ljung | ................... | H04W 88/04 370/315 |
| 2015/0305046 A1* | 10/2015 | Shin | ....................... | H04W 72/08 370/329 |
| 2016/0198508 A1* | 7/2016 | Lee | ....................... | H04W 72/02 370/329 |
| 2016/0277913 A1* | 9/2016 | Harada | .................. | H04W 92/18 |
| 2017/0034825 A1* | 2/2017 | Harada | ............. | H04W 72/0453 |
| 2017/0244468 A1* | 8/2017 | Zhao | ..................... | H04W 36/06 |
| 2018/0035276 A1* | 2/2018 | Kang | ..................... | H04W 8/005 |

OTHER PUBLICATIONS

Huawei, Hisilicon, "Relay UE selection for UE-to-Network relay", 3GPP TSG-RAN WG1 Meeting #80b R1-151278, Apr. 24, 2015, pp. 1-3.
NTT Docomo, "Views on UE-to-Network Relay Discovery", 3GPP TSG-RAN WG1 Meeting #80b R1-151965, Apr. 24, 2015, pp. 1-6.
International Search Report of CT/JP2016/000710 dated Apr. 26, 2016 [PCT/ISA/210].

* cited by examiner

| REPORT RADIO TERMINAL | RESULT OF RECEIVING DISCOVERY SIGNAL | SELECTION ORDER |
|---|---|---|
| 1 | 2 | 1 |
| 2 | 1, 7 | 2 |
| 3 | 4 | 1 |
| 4 | 3, 5, 6 | 3 |
| 5 | 4, 6 | 2 |
| 6 | 4, 5 | 2 |
| 7 | 2 | 1 |
| 8 | 9 | 1 |
| 9 | 8 | 1 |
| 10 | 11, 12, 13, 15 | 4 |
| 11 | 10, 12, 13, 14, 15 | NOT SELECTED |
| 12 | 10, 11, 14 | 3 |
| 13 | 10, 11, 14, 15 | 4 |
| 14 | 11, 12, 13, 15 | 4 |
| 15 | 10, 11, 13, 14 | 4 |
| 16 | 20 | 1 |
| 17 | 18 | 1 |
| 18 | 17, 19 | 2 |
| 19 | 18, 20 | NOT SELECTED |
| 20 | 16, 19 | 2 |

Fig. 6

D2D COMMUNICATION CONTROL APPARATUS, RADIO TERMINAL, RELAY RADIO TERMINAL CANDIDATE SELECTION METHOD, AND NON-TRANSITORY COMPUTER READABLE MEDIUM

CROSS REFERENCE TO RELATED APPLICATIONS

This application is a National Stage of International Application No. PCT/JP2016/000710, filed Feb. 10, 2016, claiming priority based on Japanese Patent Application No. 2015-127781, filed Jun. 25, 2015, the contents of all of which are incorporated herein by reference in their entirety.

TECHNICAL FIELD

The present disclosure relates to a D2D communication control apparatus, a radio terminal, a relay radio terminal candidate selection method, and a program, and relates to, for example, a D2D communication control apparatus, a radio terminal, a relay radio terminal candidate selection method, and a program regarding discovery of radio terminals in D2D communication.

BACKGROUND ART

In mobile communication systems, introduction of device-to-device (D2D) communication, in which a radio terminal directly communicates with another radio terminal, has been discussed. For example, 3rd Generation Partnership Project (3GPP), which defines standard specifications of mobile communication systems, specifies Proximity-based services (ProSe) as the D2D communication in Non-Patent Literature 1. ProSe includes ProSe discovery and ProSe direct communication. ProSe discovery makes it possible to detect proximity of radio terminals. ProSe direct communication enables establishment of a communication path between radio terminals discovered by the ProSe discovery.

Patent Literature 1 discloses a discovery procedure between radio terminals that perform D2D communication. Specifically, a User Equipment (UE) 100-1 transmits a discovery signal by broadcasting and a UE 100-2 performs processing for receiving the discovery signal that has been transmitted. The UE 100-2 performs processing for receiving the discovery signal, to thereby discover the UE 100-1 that has transmitted the discovery signal. Further, the UE 100-2 transmits a response signal to the UE 100-1, whereby the UE 100-1 is able to determine that it has been discovered by the UE 100-2. The UE 100-2 determines in advance regarding whether it is capable of performing D2D communication with the UE 100-1 based on the distance between the UE 100-2 and the UE 100-1. Therefore, the UE 100-2 is able to perform processing for receiving the discovery signal that has been transmitted from the predetermined UE in advance.

CITATION LIST

Patent Literature

[Patent Literature 1] International Patent Publication No. WO 2015/045860

Non-Patent Literature

[Non-Patent Literature 1] 3GPP TS 23.303 V12.4.0 (March 2015), "3rd Generation Partnership Project; Technical Specification Group Services and System Aspects; Proximity-based services (ProSe); Stage 2 (Release 12)", March, 2015

SUMMARY OF INVENTION

Technical Problem

In the discovery procedure disclosed in Patent Literature 1, it can be defined that the UE which is spaced apart from the UE 100-1 by a predetermined distance or smaller executes processing for receiving a transmission signal transmitted from the UE 100-1. However, when there are a large number of UEs that are spaced apart from the UE 100-1 by the predetermined distance or smaller, the UE 100-1 receives response signals that have been transmitted from the large number of respective UEs. Accordingly, a problem occurs that interference occurs between the response signals and the UE 100-1 cannot normally receive the response signals.

One of the objects to be attained by the present invention is to provide a D2D communication control apparatus, a radio terminal, a relay radio terminal candidate selection method, and a program capable of suppressing interference that occurs between response signals transmitted from a large number of radio terminals.

Solution to Problem

A D2D communication control apparatus according to a first aspect of the present invention includes: a communication unit configured to receive determination information that can be used to determine whether each of a plurality of radio terminals is capable of performing direct communication (device-to-device (D2D) communication) with another radio terminal; and a selection unit configured to select, using the determination information between radio terminals that may operate as relay radio terminals, a candidate for a relay radio terminal that relays the communication between one of the plurality of radio terminals and a network, the relay radio terminal candidate transmitting a response signal in response to a first discovery signal transmitted from the one of the radio terminals by performing D2D communication with the one of the plurality of radio terminals and performing cellular communication with the network.

A radio terminal according to a second aspect of the present invention includes: a communication unit configured to receive determination information that can be used to determine whether each of a plurality of other radio terminals is capable of performing device-to-device (D2D) communication with another radio terminal; and a selection unit configured to select, using the determination information between radio terminals that may operate as relay radio terminals, a candidate for a relay radio terminal that relays the communication between one of the plurality of radio terminals and a network, the relay radio terminal candidate transmitting a response signal in response to a first discovery signal transmitted from the one of the radio terminals by performing D2D communication with the one of the plurality of radio terminals and performing cellular communication with the network.

A relay radio terminal candidate selection method according to a third aspect of the present invention includes: receiving determination information that can be used to determine whether each of a plurality of radio terminals is capable of performing device-to-device (D2D) communication with another radio terminal; and selecting, using the determination information between radio terminals that may operate as relay radio terminals, a candidate for a relay radio terminal that relays the communication between one of the plurality of radio terminals and a network, the relay radio terminal candidate transmitting a response signal in response to a first discovery signal transmitted from the one of the radio terminals by performing D2D communication with the one of the plurality of radio terminals and performing cellular communication with the network.

A program according to a fourth aspect of the present invention causes a computer to execute the following operations of: receiving determination information that can be used to determine whether each of a plurality of radio terminals is capable of performing device-to-device (D2D) communication with another radio terminal; and selecting, using the determination information between radio terminals that may operate as relay radio terminals, a candidate for a relay radio terminal that relays the communication between one of the plurality of radio terminals and a network, the relay radio terminal candidate transmitting a response signal in response to a first discovery signal transmitted from the one of the radio terminals by performing D2D communication with the one of the plurality of radio terminals and performing cellular communication with the network.

Advantageous Effects of Invention

According to the present invention, it is possible to provide a D2D communication control apparatus, a radio terminal, a relay radio terminal candidate selection method, and a program capable of suppressing interference that occurs between response signals transmitted from a large number of radio terminals.

BRIEF DESCRIPTION OF DRAWINGS

FIG. 6 is a diagram showing results of receiving discovery signals by radio terminals according to the second embodiment.

DESCRIPTION OF EMBODIMENTS

First Embodiment

Figure 1:
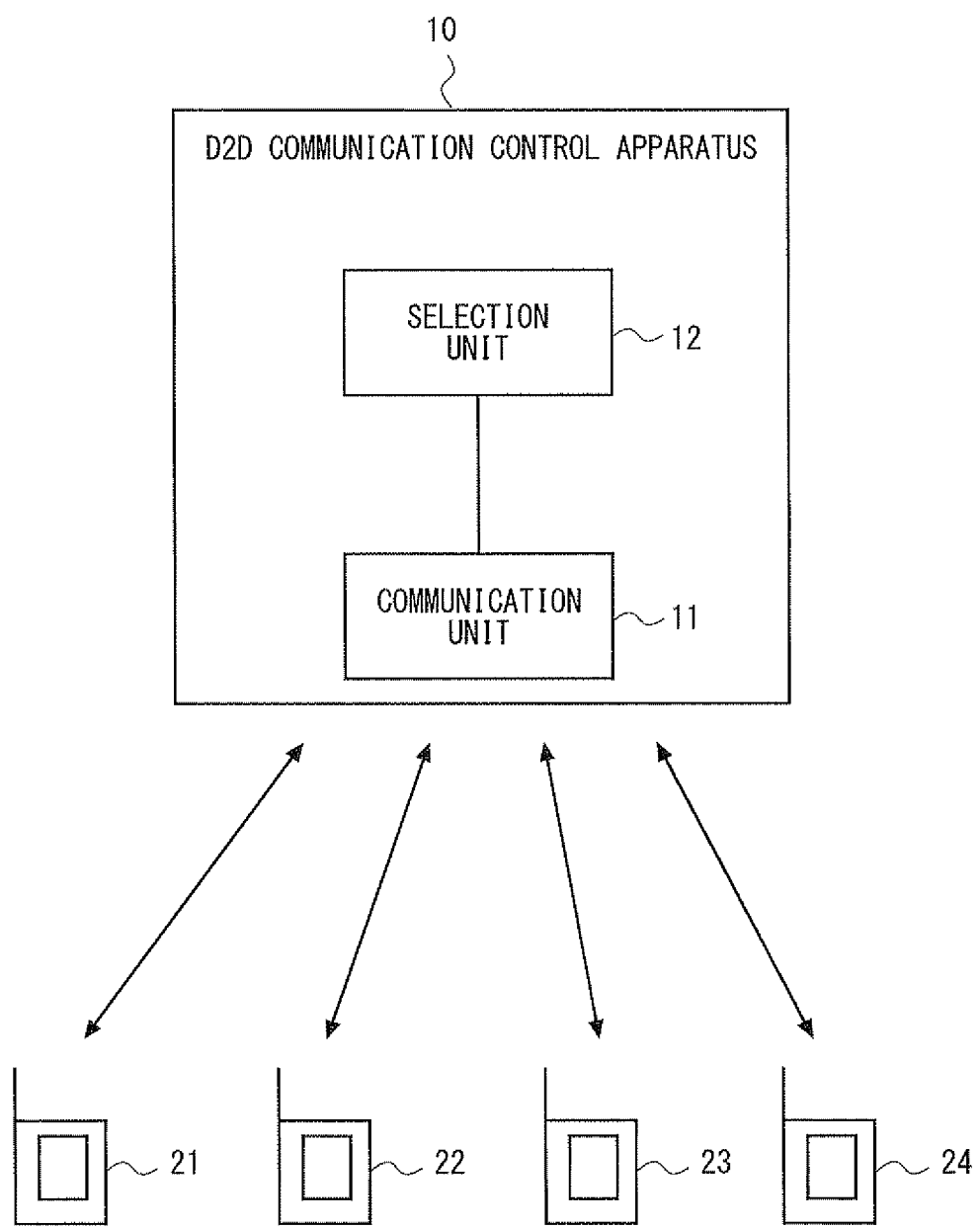
FIG. 1 is a configuration diagram of a D2D communication control apparatus according to a first embodiment.

Specific embodiments of the present invention will be explained hereinafter with reference to the drawings. First, with reference to FIG. 1, a configuration example of a D2D communication control apparatus 10 according to a first embodiment of the present invention will be described. The D2D communication control apparatus 10 may be a computer apparatus that is operated by a processor executing a program stored in a memory. Alternatively, the D2D communication control apparatus 10 may be a server apparatus.

Alternatively, the D2D communication control apparatus 10 may be an apparatus that executes a ProSe function. The ProSe function is a logical function that is used for public land mobile network (PLMN)-related operations required for ProSe. The functionality provided by the ProSe function includes, for example: (a) communication with third-party applications (a ProSe Application Server); (b) authentication of a radio terminal (UE) for ProSe discovery and ProSe direct communication; (c) transmission of configuration information for ProSe discovery and ProSe direct communication (e.g., EPC-ProSe-User ID) to a UE; and (d) provision of network-level discovery (i.e., EPC-level ProSe discovery).

In EPC-level ProSe discovery, a D2D communication control apparatus or a core network (Evolved Packet Core (EPC)) determines proximity of two radio terminals and notifies the two radio terminals of the result of the determination.

The apparatus that executes the ProSe function may be referred to as, for example, a ProSe function entity or a ProSe function server.

The D2D communication control apparatus 10 includes a communication unit 11 and a selection unit 12. Each of the communication unit 11 and the selection unit 12 may be software, a module or the like whose processing is executed by a processor executing a program stored in a memory. Alternatively, each of the communication unit 11 and the selection unit 12 may be hardware such as a circuit or a chip.

The communication unit 11 receives determination information that can be used to determine whether each of radio terminals 21-24 is capable of performing the D2D communication with a radio terminal located nearby.

The radio terminals 21-24 may be, for example, a mobile telephone terminal, a smartphone terminal, or a Machine Type Communication (MTC) terminal that autonomously performs communication without requiring user manipulation. The D2D communication may be, for example, ProSe discovery and ProSe direct communication.

The determination information that can be used to determine whether the D2D communication can be performed with the radio terminal located nearby may be, for example, positional information generated by each of the radio terminals 21-24. The positional information may be, for example, GNSS positional information obtained by a Global Navigation Satellite System (GNSS) receiver. The D2D communication control apparatus 10 may calculate the distance between radio terminals using, for example, the positional information on the radio terminals. The D2D communication control apparatus 10 may determine, when the calculated distance is shorter than a predetermined distance, that the radio terminals can perform D2D communication.

Further, the determination information may be information on a result of receiving a discovery signal that each of the radio terminals 21-24 has received from a nearby radio terminal. The discovery signal may be referred to as, for example, a Discovery signal. It is assumed here that the radio terminal that has received the discovery signal used for the determination information needs not transmit a response signal in response to the discovery signal. The D2D communication control apparatus 10 may determine that the radio terminal that has received the discovery signal and the radio terminal that has transmitted this discovery signal are able to perform D2D communication.

Each of the radio terminals 21-24 performs D2D communication with another radio terminal. Further, each of the radio terminals 21-24 performs cellular communication with a network. Accordingly, each of the radio terminals 21-24 serves as a relay radio terminal that relays communication between another radio terminal and the network.

The selection unit 12 selects, from among the radio terminals 21-24, a candidate for a relay radio terminal, which is a relay radio terminal candidate that transmits the response signal in response to the discovery signal transmitted from one of the radio terminals 21-24 using the determination information between the radio terminals that may operate as the relay radio terminals.

The relay radio terminal performs cellular communication with the network using, for example, the cellular communication technology (e.g., Evolved Universal Terrestrial Radio Access (E-UTRA) technology). Further, while the radio terminal actually communicates with the network via one relay radio terminal, a plurality of relay radio terminal candidates may be present. The radio terminal transmits, when it communicates with the network via the relay radio terminal, the discovery signal to the nearby radio terminal. The plurality of relay radio terminal candidates transmit, to the radio terminal, the response signal in response to the discovery signal. The radio terminal that does not correspond to the relay radio terminal candidate does not transmit the response signal in response to the discovery signal. The radio terminal may select the relay radio terminal from among the relay radio terminal candidates in accordance with the result of receiving the response signal.

The determination information between the radio terminals that may operate as the relay radio terminals may be positional information on the radio terminal that may operate as the relay radio terminal or may be information on the result of receiving the discovery signal between the radio terminals that may operate as the relay radio terminals.

For example, all the radio terminals 21-24 may be the radio terminals that may operate as the relay radio terminals or the radio terminals 22-24 other than the radio terminal 21 may be the radio terminals that may operate as the relay radio terminals.

As described above, the D2D communication control apparatus 10 shown in FIG. 1 is able to select the relay radio terminal candidate, which is the candidate for the relay radio terminal. Accordingly, even in the case in which the radio terminal has transmitted the discovery signal to the nearby radio terminal in order to search for the relay radio terminal, the radio terminal no longer receives the response signal from all the radio terminals that have received the discovery signal. It is therefore possible to suppress the interference that occurs between the response signals compared to the case in which all the radio terminals that have received the discovery signal transmit the response signal.

Further, the D2D communication control apparatus 10 is able to select the relay radio terminal candidate using the determination information between the radio terminals that may operate as the relay radio terminals. In other words, the D2D communication control apparatus 10 is able to select the relay radio terminal candidate in accordance with the positional relation of the radio terminals that may operate as the relay radio terminals, the discovery status between the radio terminals that may operate as the relay radio terminals or the like.

Further, while the example in which the D2D communication control apparatus 10 selects the relay radio terminal candidate has been described in FIG. 1, the base station, the core network apparatus, the radio terminal or the like arranged in the mobile communication network may execute the processing for selecting the relay radio terminal candidate.

Second Embodiment

Next, with reference to FIG. 2, a configuration example of a mobile communication system according to a second embodiment of the present invention will be described. The mobile communication system shown in FIG. 2 includes the D2D communication control apparatus 10, the radio terminals 21-24, a core network 30, and a base station 40.

Since the D2D communication control apparatus 10 is similar to the D2D communication control apparatus 10 shown in FIG. 1, the detailed descriptions thereof will be omitted. Further, since the radio terminals 21-24 are also similar to the radio terminals 21-24 shown in FIG. 1, the detailed descriptions thereof will be omitted.

The core network 30 may be, for example, an EPC, and includes a plurality of user-plane entities and a plurality of control-plane entities. The user-plane entity may be, for example, Serving Gateway (S-GW) and Packet Data Network Gateway (P-GW). Further, the control-plane entity may be Mobility Management Entity (MME) and Home Subscriber Server (HSS). Each of the user-plane entity and the control-plane entity may be referred to as a core network apparatus. Further, the core network 30 may include a ProSe function entity, a ProSe function server or the like. Further, the user-plane entity or the control-plane entity may execute the ProSe function as the ProSe function entity.

The plurality of user-plane entities relay user data of the radio terminals 21-24 between the radio access network including the base station 40 and an external network. The plurality of control-plane entities perform various kinds of control for the radio terminals 21-24 including mobility management, session management (bearer management), subscriber information management, and billing management.

The base station 40 forms a cell 41. The cell 41 is an area where radio terminals are able to perform cellular communication with the base station 40. Further, a coverage hole 42 is an area in the cell 41 and is an area in which radio terminals cannot perform cellular communication with the base station 40 or an area in which a desired cellular communication (whose communication rate is equal to or larger than a predetermined value) cannot be performed. For example, the coverage hole 42 is generated in a building located in the cell 41, an area surrounded by a plurality of buildings and the like. The base station 40 may be, for example, an evolved NodeB (eNB) defined by the 3GPP.

Figure 2:
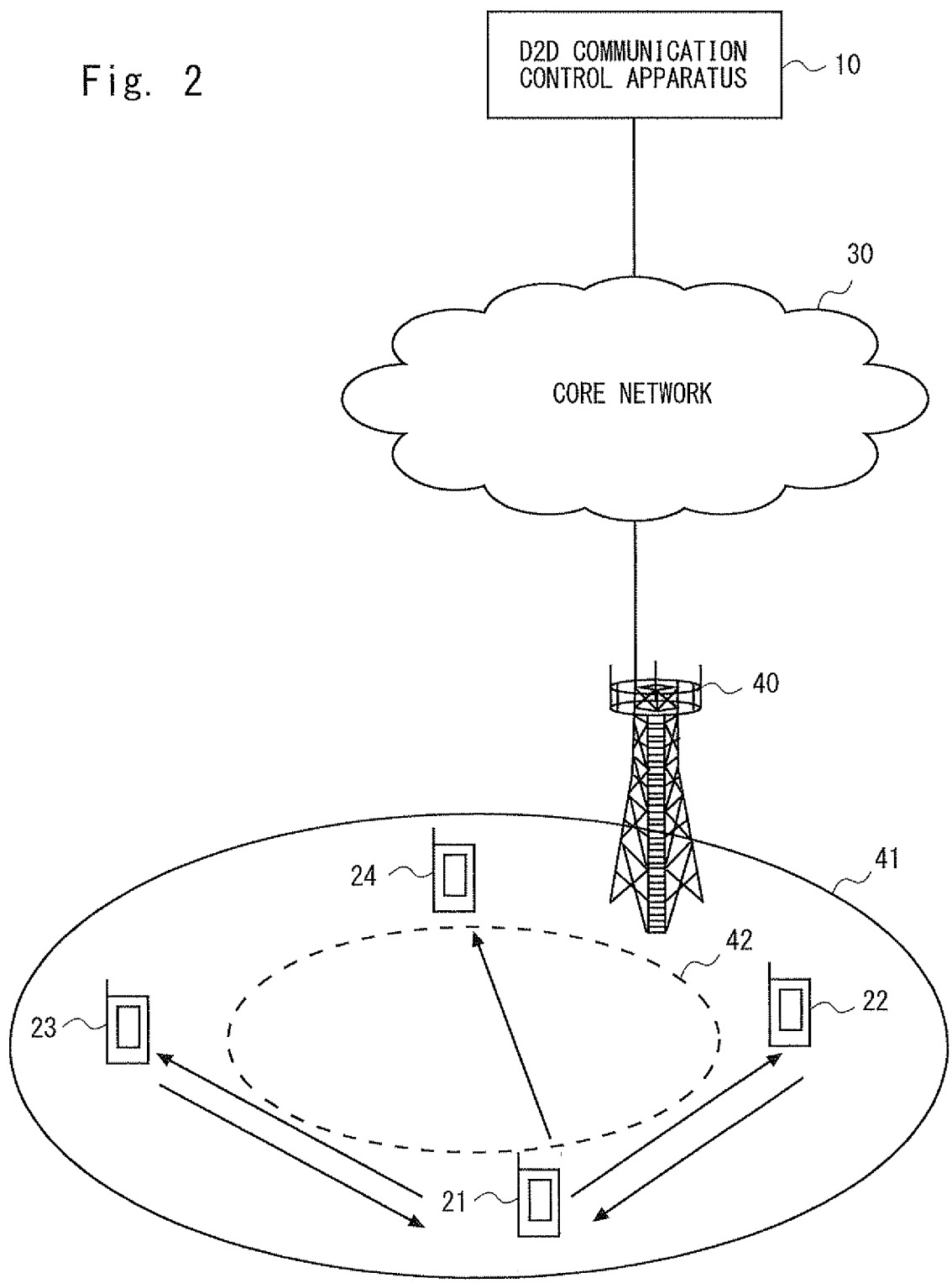
FIG. 2 is a configuration diagram of a mobile communication system according to a second embodiment.

FIG. 2 shows that the radio terminal 22 and the radio terminal 23 are the relay radio terminal candidates. Specifically, the radio terminal 21 transmits the discovery signal to the nearby radio terminals 22-24 in order to communicate with the base station 40 via the relay radio terminal. The discovery signal that the radio terminal 21 transmits to the nearby radio terminals 22-24 in order to communicate with the base station 40 via the relay radio terminal will be explained as a relay terminal request in the following description.

The radio terminal 21 is located close to the coverage hole 42, and when the radio terminal 21 estimates that it will not be able to communicate with the base station 40 any more or will not be able to perform a desired cellular communication with the base station 40, the radio terminal 21 may transmit the relay terminal request to the nearby radio terminals 22-24. The radio terminal 21 may periodically measure, for example, Reference Signal Received Power (RSRP) or Reference Signal Received Quality (RSRQ) and may estimate that it will not be able to communicate with the base station 40 when the communication quality indicated by the RSRP or the RSRQ is lower than a predetermined communication quality. In other words, the radio terminal 21 may determine the timing when the relay terminal request is transmitted based on the value of RSRP or RSRQ. Further, the index for measuring, by the radio terminal 21, the communication quality is not limited to RSRP or RSRQ. Alternatively, the radio terminal 21 may periodically measure the communication rate (throughput) of the data transmitted to and received from the base station 40 and estimate that it will not be able to perform a desired cellular communication with the base station 40 when the value of the communication rate that has been measured is below a predetermined value.

The radio terminal 22 and the radio terminal 23, which are the relay radio terminal candidates, each transmit the response signal to the radio terminal 21 in response to the relay terminal request, and the radio terminal 24, which is not the relay radio terminal candidate, does not transmit the response signal to the radio terminal 21.

The radio terminal 21 communicates with the base station 40 via one of the radio terminal 22 and the radio terminal 23, which are the relay radio terminal candidates.

While a state in which the radio terminals 21-24 are located in the cell 41 is shown in FIG. 2, some of the radio terminals 21-24 may be located in a cell formed by another base station.

Next, with reference to FIG. 3, a configuration example of the D2D communication control apparatus 10 according to the second embodiment of the present invention will be described. The D2D communication control apparatus 10 includes the communication unit 11, the selection unit 12, a transmission data processing unit 13, and a reception data processing unit 14. Since the communication unit 11 and the selection unit 12 are similar to the communication unit 11 and the selection unit 12 in FIG. 1, the detailed descriptions thereof will be omitted.

The reception data processing unit 14 receives the determination information via the communication unit 11. Further, the reception data processing unit 14 outputs the determination information that it has received to the selection unit 12. The selection unit 12 selects the relay radio terminal candidate using the determination information. The selection unit 12 outputs the information regarding the relay radio terminal candidate that it has selected to the transmission data processing unit 13.

The transmission data processing unit 13 transmits, to the core network apparatus, an indication signal used to notify the relay radio terminal candidate selected by the selection unit 12 that it is the relay radio terminal candidate via the communication unit 11. The core network apparatus is arranged in the core network 30. In the following description, the indication signal is described as a relay terminal indication. The transmission data processing unit 13 may configure, as the destination of the relay terminal indication, address information on the radio terminal that has been selected as the relay radio terminal candidate by the selection unit 12. The relay terminal indication may be generated in the selection unit 12 or may be generated in the transmission data processing unit 13.

Figure 4:
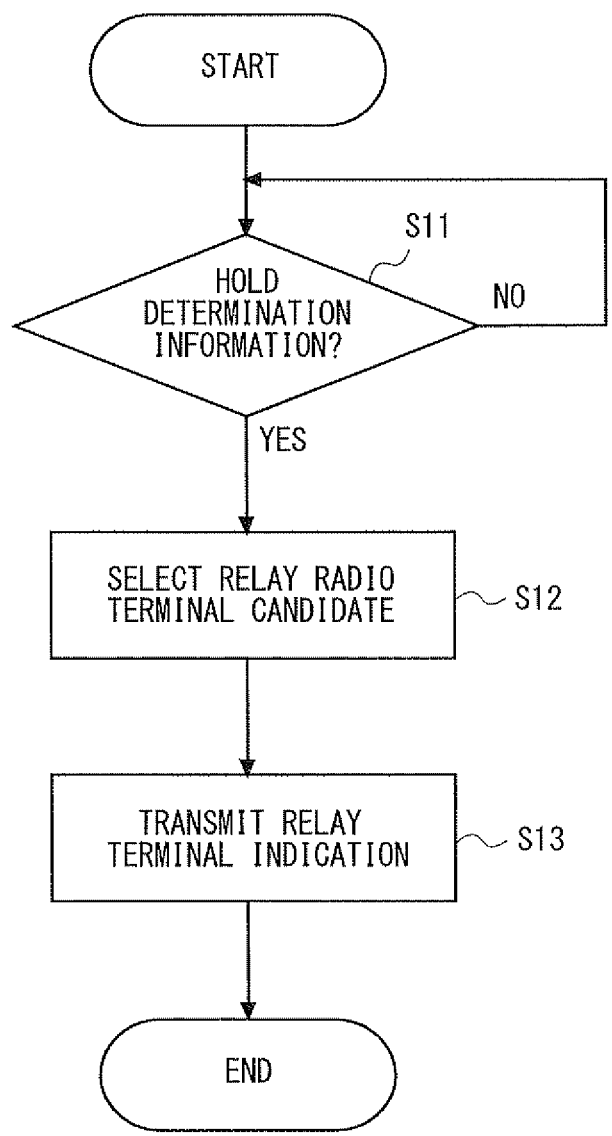
FIG. 4 is a diagram showing a flow of selection processing in the D2D communication control apparatus according to the second embodiment.

Next, with reference to FIG. 4, a flow of the selection processing in the D2D communication control apparatus 10 according to the second embodiment of the present invention will be explained. First, the selection unit 12 determines whether it holds the determination information (S11). The selection unit 12 may store or record, upon receiving the determination information output from the reception data processing unit 14, the determination information in a memory or the like in the D2D communication control apparatus 10.

When the selection unit 12 determines that it does not hold the determination information, the process in Step S11 is repeated.

When the selection unit 12 determines that it holds the determination information, the selection unit 12 selects the relay radio terminal candidate using the determination information (S12). Next, the transmission data processing unit 13 transmits the relay terminal indication to the relay radio terminal candidate selected in the communication unit 11 (S13).

When the transmission data processing unit 13 transmits the relay terminal indication to the radio terminal that has been selected as the relay radio terminal candidate in Step S13, it may also transmit information for indicating the timing when the response signal in response to the relay terminal request is transmitted as well. Specifically, the transmission data processing unit 13 or the selection unit 12 may control the relay radio terminal candidates in such a way that the relay radio terminal candidates transmit the response signals at timings different from one another. By making the timings when the plurality of relay radio terminal candidates transmit the response signals in response to the relay terminal request different from one another, it is possible to reduce the interference that occurs between the response signals compared to the case in which the plurality of relay radio terminal candidates transmit the response signals at the same timing.

The information regarding the timing when the response signal is transmitted may include at least one of an offset value from the timing when the relay terminal request has been received from the radio terminal 21 to the timing when the response signal is transmitted and information regarding the subframe number at which the transmission of the response signal is permitted.

The details of the processing for selecting the relay radio terminal candidate in Step S12 will now be explained. First, a case in which the D2D communication control apparatus 10 receives the positional information on each of the radio terminals as the determination information will be explained. The selection unit 12 calculates, from the positional information on each of the radio terminals, the distance X between the radio terminals. The selection unit 12 may select, for example, the radio terminals having a distance X between them which is equal to or larger than a distance a (a>0) as the relay radio terminal candidates. By selecting the radio terminals that are spaced apart from each other by a predetermined distance a or larger as the relay radio terminal candidates, it is possible to select the radio terminals whose radio environments are different from each other.

Accordingly, when, for example, the radio terminal that communicates with the network via the relay radio terminal selects a relay radio terminal from among the relay radio terminal candidates, the relay radio terminal candidate that is using a radio channel with a high radio quality can be selected as the relay radio terminal.

Alternatively, the selection unit 12 may define a distance b (b>a) as the upper-limit value of the distance X. The selection unit 12 may specify, for example, the longest distance in the cell 41 such as the length of the diameter or the length of the long diameter of the cell 41 as the distance b.

Alternatively, the selection unit 12 may select a relay radio terminal candidate for each radio communication terminal. Specifically, the selection unit 12 may allocate a relay radio terminal candidate to the radio terminal 21 different from the relay radio terminal candidate allocated to the radio terminal 22 or the like. When, for example, the selection unit 12 is to select a relay radio terminal candidate to be allocated to the radio terminal 21, the selection unit 12 may select the radio terminals other than the radio terminal 21 having a distance X between them which is from a (inclusive) to b (inclusive), the radio terminal being spaced apart from the radio terminal 21 by c (c>0) or smaller as the relay radio terminal candidate. The distance c may be, for example, a distance in which the D2D communication can be performed with the radio terminal 21. Further, the selection unit 12 may select a radio terminal which is spaced apart from the radio terminal 21 by d (0<d<c) or larger as the relay radio terminal candidate. By setting the radio terminal which is spaced apart from the radio terminal 21 by a predetermined distance d as the relay radio terminal candidate, the selection unit 12 is able to select the radio terminal which is spaced apart from the coverage hole by a predetermined distance as the relay radio terminal candidate. When the radio terminal 21 is located near the coverage hole, the radio terminal which is located substantially in the same place as the radio terminal 21 is also located near the coverage hole. Therefore, the distance d may be defined in order to exclude the radio terminal that is located substantially in the same place as the radio terminal 21 from the relay radio terminal candidates as the relay radio terminal candidate of the radio terminal 21.

Next, a case in which the D2D communication control apparatus 10 has received information on the result of receiving the discovery signal in each of the radio terminals as the determination information will be described. The information on the result of receiving the discovery signal may include, for example, at least one of identification information on the radio terminal that has transmitted the discovery signal, the reception power of the discovery signal that has been received, and the number of times that the discovery signal transmitted from the radio terminal is received. In the following description, a case in which the identification information on the radio terminal that has transmitted the discovery signal is included in the determination information will be mainly described.

Each of the radio terminals receives the discovery signal that has been transmitted from one or more radio terminals. It is assumed that, when each of the radio terminals receives the discovery signal, it has discovered the radio terminal that has transmitted this discovery signal. In this example, the radio terminal that the radio terminal has discovered is referred to as a discovery terminal element. The selection unit 12 may select the relay radio terminal candidate by, for example, the following procedure.

(a) The radio terminals in which the number of discovery terminal elements is equal to or smaller than a threshold in the determination information are selected as the relay radio terminal candidates. Alternatively, the radio terminals in which the number of discovery terminal elements is the smallest in the determination information may be selected as the relay radio terminal candidates.

(b) Among the radio terminals that do not include the discovery terminal elements of the relay radio terminal candidates selected in (a), the radio terminals in which the number of discovery terminal elements is equal to or smaller than a threshold are selected as the relay radio terminal candidates. Alternatively, among the radio terminals that do not include the discovery terminal elements of the relay radio terminal candidate selected in (a), the radio terminals in which the number of discovery terminal elements is the smallest may be selected as the relay radio terminal candidates.

(c) The procedure (b) is repeated until all the radio terminals in the cell are included in the discovery terminal elements of the relay radio terminal candidates.

The procedures (b) and (c) may be repeated until all the radio terminals are counted n times (n is an integer equal to or larger than 1) as the discovery terminal elements of the relay radio terminal candidates.

While the radio terminal in which the number of discovery terminal elements is small has been selected as the relay radio terminal candidates in the aforementioned procedures (a)-(c), the radio terminal in which the number of discovery terminal elements is large may be selected as the relay radio terminal candidates. For example, the radio terminal in which the number of discovery terminal elements is equal to or larger than a threshold or the radio terminal in which the number of discovery terminal elements is the largest may be selected as the relay radio terminal candidates.

Figure 5:
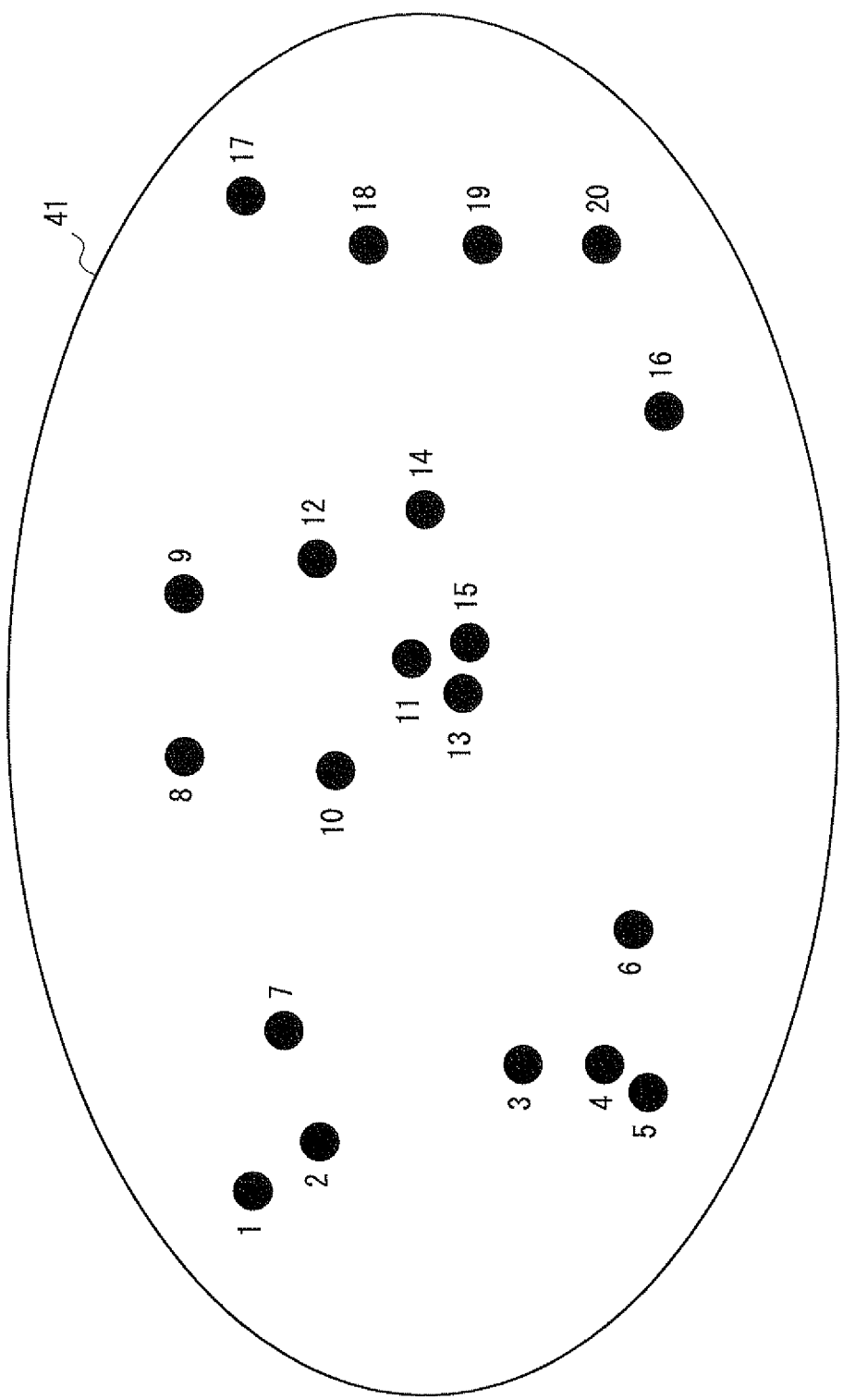
FIG. 5 is a diagram showing a location in which radio terminals are present in a cell according to the second embodiment.

With reference to FIGS. 5 and 6, the procedures (a)-(c) will be explained in detail. FIG. 5 shows a location where radio terminals are present in the cell 41. The black circles indicate the radio terminals. Further, the numerals attached next to the black circles are identification information on the radio terminals.

FIG. 6 shows a report radio terminal in association with a discovery terminal element in the report radio terminal, the report radio terminal being the radio terminal that has transmitted the determination information including the information on the result of receiving the discovery signal. For example, FIG. 6 shows that the radio terminal 1 has discovered the radio terminal 2. Further, it shows that the radio terminal 2 has discovered the radio terminals 1 and 7. The same is applicable to the radio terminal 3 and the subsequent radio terminals.

First, by the procedure (a), the radio terminals 1, 3, 7, 8, 9, 16, and 17 in which the number of discovery terminal elements is the smallest, that is, 1, are selected as the relay radio terminal candidates. The selection order shown in FIG. 6 indicates the order of selection as the relay radio terminal candidates. FIG. 6 shows that the radio terminals 1, 3, 7, 8, 9, 16, and 17 have been selected first as the relay radio terminal candidates.

Next, by the procedure (b), from among the radio terminals that do not include the discovery terminal elements of the radio terminals 1, 3, 7, 8, 9, 16, and 17, the radio terminals 2, 5, 6, 18, and 20 in which the number of discovery terminal elements is the smallest, that is, 2, are selected as the relay radio terminal candidates. That is, the radio terminals 2, 5, 6, 18, and 20 are selected second as the relay radio terminal candidates.

Next, by the procedure (c), from among the radio terminals that do not include the discovery terminal elements of the relay radio terminal candidates selected in the procedures (a) and (b), the radio terminals 4 and 12 in which the number of discovery terminal elements is the smallest, that is, 3, are selected as the relay radio terminal candidates. Further, from among the radio terminals that do not include the discovery terminal elements of the relay radio terminal candidates selected in the aforementioned procedure, the radio terminals 10, 13, 14, and 15 in which the number of discovery terminal elements is the smallest, that is, 4, are selected as the relay radio terminal candidates. From the aforementioned procedure, the radio terminals 1-20 are included in the discovery terminal elements of any one of the relay radio terminal candidates.

In the example shown in FIG. 6, the radio terminals 11 and 19 are not selected as the relay radio terminal candidates. Therefore, even when the radio terminals 11 and 19 receive the relay terminal request, they do not transmit a response signal to the radio terminal that has transmitted the relay terminal request. Further, with respect to FIG. 6, the case in which, when one of the two radio terminals has received the discovery signal, the other radio terminal also receives the discovery signal has been described. However, there is also a case in which while one radio terminal has received the discovery signal, the other radio terminal cannot receive the discovery signal due to the difference between the timing when the discovery signal is transmitted to the one radio terminal and the timing when it is transmitted to the other radio terminal. In this case as well, the aforementioned procedures (a)-(c) can be executed.

In the aforementioned description, the procedure for selecting a common relay radio terminal candidate in the cell 41 has been described. That is, no matter which one of the radio terminals located in the cell 41 has transmitted the relay terminal request, the common relay radio terminal candidates that have received the relay terminal request transmit the response signal. In other words, any one of the radio terminals located in the cell 41 is able to transmit the relay terminal request to at least one of the common relay radio terminal candidates.

On the other hand, the relay radio terminal candidate may be selected for each radio terminal in the cell 41. When, for example, the relay radio terminal candidate is selected for each radio terminal, the selection unit 12 may select, from among the radio terminals including the target radio terminal as the discovery terminal element, the radio terminal in which the number of discovery terminal elements is the smallest as the relay radio terminal candidate.

For example, with reference to FIG. 6, the case in which the relay radio terminal candidate of the radio terminal 4 is selected will be explained. The radio terminals 3, 5, and 6 include the radio terminal 4 as the discovery terminal element. Among them, the radio terminal 3 has the least number of discovery terminal elements. Accordingly, the radio terminal 3 is selected as the relay radio terminal candidate of the radio terminal 4.

Further, when the selection unit 12 selects the relay radio terminal candidate for each radio terminal, the selection unit 12 may select, as the relay radio terminal candidate, the radio terminals that include the target radio terminal as the discovery terminal element and may become the relay radio terminals having not discovered each other.

For example, a case in which the relay radio terminal candidate of the radio terminal 20 is selected in FIG. 6 will be described. The radio terminals 16 and 19 include the radio terminal 20 as the discovery terminal element. Among them, the radio terminal 16 and the radio terminal 19 have not discovered each other. Accordingly, the radio terminals 16 and 19 are selected as the relay radio terminal candidates of the radio terminal 20.

In the aforementioned description, the procedure for selecting the relay radio terminal candidate when the identification information on the radio terminal is used has been mainly described above. Alternatively, the selection unit 12 may select the relay radio terminal candidate using information regarding the reception power of the discovery signal or the number of times that the discovery signal has been received.

When, for example, the selection unit 12 selects the relay radio terminal candidate with respect to one radio terminal, the selection unit 12 may select the radio terminal that has transmitted the discovery signal whose reception power in the one radio terminal is larger than a predetermined value as the relay radio terminal candidate. In this case, it is possible to maintain a high communication quality between the one radio terminal and the relay radio terminal candidate. Alternatively, the selection unit 12 may select, when selecting the relay radio terminal candidate with respect to one radio terminal, the radio terminal that has transmitted the discovery signal whose reception power in the one radio terminal is smaller than a predetermined value as the relay radio terminal candidate. In this case, the reception power is small, whereby it is possible to reduce the interference that occurs between the response signals transmitted to the one radio terminal.

Alternatively, when the number of times that the discovery signal transmitted from one radio terminal has been received is larger than a predetermined value, this radio terminal may be selected as the relay radio terminal candidate. In this case, it is possible to improve the probability that the D2D communication can be normally executed.

Besides the aforementioned information, when, for example, each of the radio terminals has already operated as the relay radio terminal, the selection unit 12 may select the relay radio terminal candidate in accordance with the number of radio terminals that are executing D2D communication. For example, the selection unit 12 may select the radio terminal in which the number of radio terminals that are executing D2D communication is smaller than a predetermined value as the relay radio terminal. It is therefore possible to reduce the processing load of the relay radio terminal candidate.

Besides the aforementioned information, the selection unit 12 may select the relay radio terminal candidate in accordance with, for example, the communication quality or the radio quality of the cellular communication line in each of the radio terminals. For example, the radio terminal in which the communication quality or the radio quality of a cellular communication line is higher than a predetermined value may be selected as the relay radio terminal candidate. Accordingly, when the relay radio terminal candidate is operated as the relay radio terminal, communication with excellent throughput and the like can be achieved.

Besides the aforementioned information, the selection unit 12 may select, for example, the relay radio terminal candidate in accordance with a residual capacity of a battery in each of the radio terminals. The selection unit 12 may select, for example, the radio terminal whose residual capacity of the battery is larger than a predetermined capacity as the relay radio terminal candidate.

Further, the selection unit 12 may select the relay radio terminal candidate by combining positional information, determination information, information on the number of radio terminals that are executing D2D communication, information on the communication quality of the cellular communication line, information on the residual capacity of the battery and the like.

Figure 7:
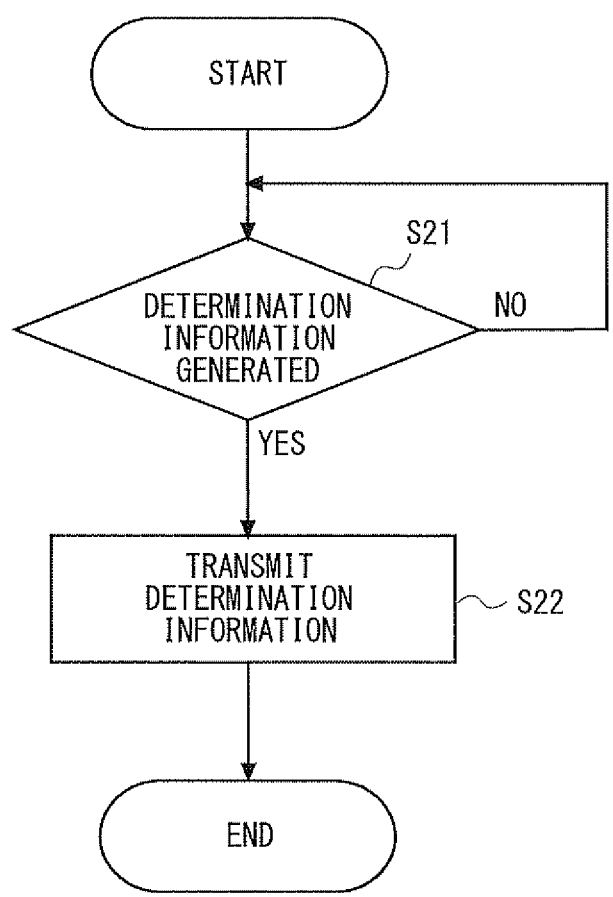
FIG. 7 is a diagram showing a flow of processing of transmitting determination information by a radio terminal according to the second embodiment.

Next, with reference to FIG. 7, a flow of the processing of transmitting, by the radio terminal, the determination information according to the second embodiment of the present invention will be explained. In this example, a flow of the processing in the radio terminal 21 will be explained. Since the processing of the other radio terminals is similar to the processing of the radio terminal 21, the detailed descriptions thereof will be omitted.

First, the radio terminal 21 determines whether the determination information has been generated (S21). The radio terminal 21 generates the determination information at the timing when, for example, the GNSS receiver has acquired the positional information, at the timing when the discovery signal transmitted from another radio terminal has been received or the like.

When it is determined that the determination information has not been generated, the radio terminal 21 repeats the processing of Step S21. When it is determined that the determination information has been generated, the radio terminal 21 transmits the determination information that has been generated to the D2D communication control apparatus 10 (S22).

Figure 8:
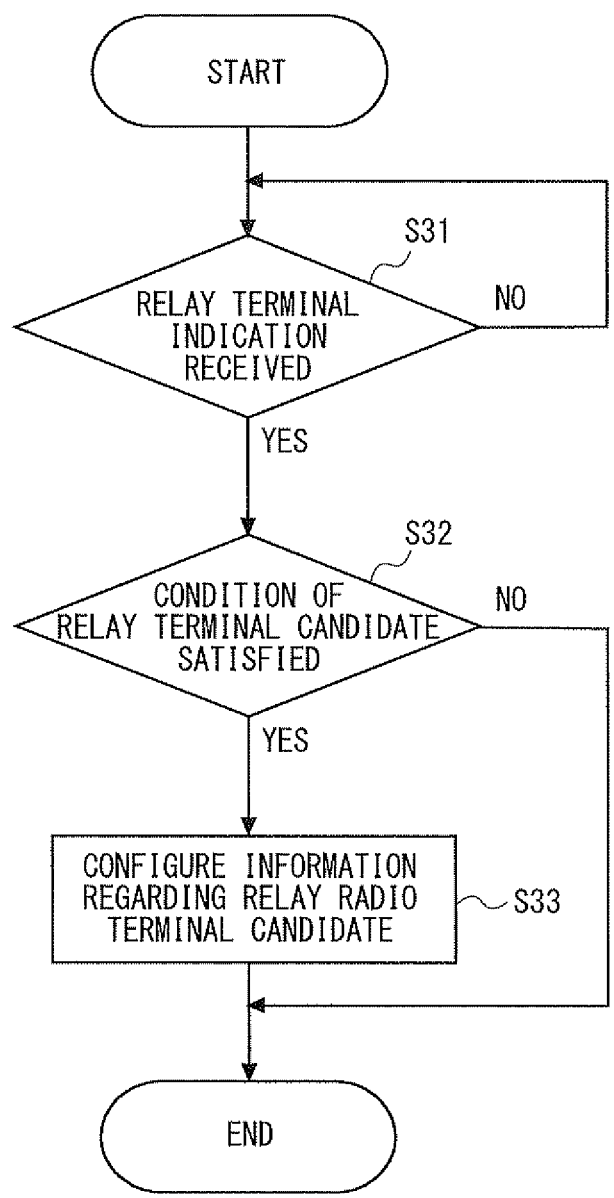
FIG. 8 is a diagram showing a flow of processing of the radio terminal when it has received a relay terminal indication according to the second embodiment.

Next, with reference to FIG. 8, a flow of the processing of the radio terminal when it has received the relay terminal indication will be explained. In this example, a flow of processing in the radio terminal 22 will be explained. Since the processing in the other radio terminals is similar to that in the radio terminal 22, the detailed descriptions thereof will be omitted. First, the radio terminal 22 determines whether it has received the relay terminal indication transmitted from the D2D communication control apparatus 10 (S31). When it is determined that the relay terminal indication has not been received, the radio terminal 22 repeats the processing of Step S31.

When it is determined that the radio terminal 22 has received the relay terminal indication, the radio terminal 22 determines whether the radio terminal 22 satisfies a condition of the relay radio terminal candidate (S32). The condition of the relay radio terminal candidate may be, for example, the residual capacity of the battery is larger than a predetermined capacity, the number of radio terminals to be relayed is smaller than a predetermined number, or the cellular communication quality is better than a predetermined quality.

When it is determined that the radio terminal 22 does not satisfy the condition of the relay radio terminal candidate, the radio terminal 22 ends the processing. That is, the radio terminal 22 does not execute the operation as the relay radio terminal candidate.

When it is determined that the radio terminal 22 satisfies the condition of the relay radio terminal candidate, the radio terminal 22 configures the information for operating as the relay radio terminal candidate (S33). The information for operating as the relay radio terminal candidate may be, for example, information that defines operations and the like when the relay terminal request is received.

Figure 9:
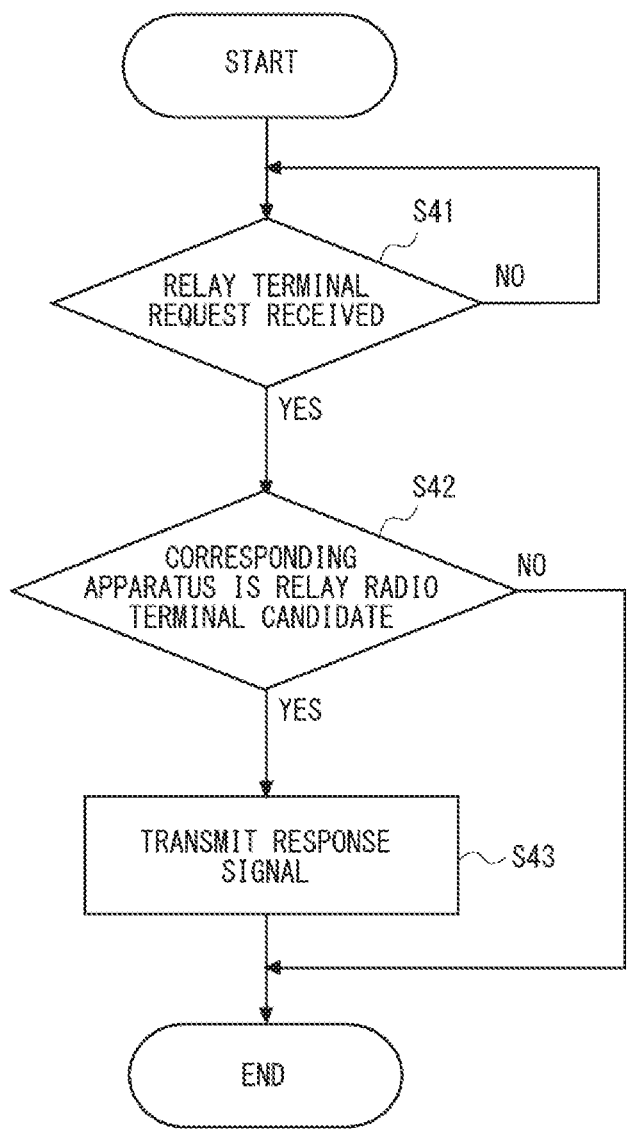
FIG. 9 is a diagram showing a flow of processing of the radio terminal when it has received a relay terminal request according to the second embodiment.

Next, with reference to FIG. 9, a flow of the processing of the radio terminal when it has received the relay terminal request will be explained. In this example, a flow of processing in the radio terminal 22 will be explained. First, the radio terminal 22 determines whether it has received the relay terminal request that has been transmitted from another radio terminal (S41).

When it is determined that the radio terminal 22 has not received the relay terminal request, the radio terminal 22 repeats the processing of Step S41. When it is determined that the radio terminal 22 has received the relay terminal request, the radio terminal 22 determines whether it is the relay radio terminal candidate (S42). In other words, the radio terminal 22 receives the relay terminal indication and determines whether it satisfies the condition of the relay radio terminal candidate.

When it is determined that the radio terminal 22 is the relay radio terminal candidate, the radio terminal 22 transmits the response signal to the radio terminal that has transmitted the relay terminal request (S43). When it is determined in Step S42 that the radio terminal 22 is not the relay radio terminal candidate, it ends the processing. In other words, when it is determined that the radio terminal 22 is not the relay radio terminal candidate, the radio terminal 22 does not transmit the response signal to the radio terminal that has transmitted the relay terminal request.

Next, with reference to FIG. 10, a sequence of processing for selecting the relay radio terminal candidate according to the second embodiment of the present invention will be explained. First, each of the radio terminals 21-24 transmits the discovery signal to the nearby radio terminal. Specifically, the radio terminal 22 transmits, in Steps S51-S53, the discovery signal to the radio terminal 21, the radio terminal 23, and the radio terminal 24. In a similar way, in Steps S54-S56, the radio terminal 23 transmits the discovery signal to the radio terminal 22, the radio terminal 21, and the radio terminal 24. In a similar way, in Steps S57-S59, the radio terminal 21 transmits the discovery signal to the radio terminal 22, the radio terminal 23, and the radio terminal 24. In a similar way, in Steps S60-S62, the radio terminal 24 transmits the discovery signal to the radio terminal 23, the radio terminal 22, and the radio terminal 21.

While the discovery signal is transmitted to the radio terminal 22, the radio terminal 23, the radio terminal 21, and the radio terminal 24 in this order in Steps S51-S62, the order of transmitting the discovery signal is not limited to this order. Further, while the processing of specifying, by each of the radio terminals, the destination radio terminal and transmitting the discovery signal to this destination radio terminal has been described in Steps S51-S62, each of the radio terminals may collectively transmit the discovery signal to the nearby radio terminals by broadcasting.

Next, upon receiving the discovery signal, each of the radio terminals 21-24 transmits the determination information including the results of receiving the discovery signal to the D2D communication control apparatus 10 (S63-S66). Next, the D2D communication control apparatus 10 selects the relay radio terminal candidate using the determination information transmitted from each of the radio terminals 21-24 (S67). Next, the D2D communication control apparatus 10 transmits the relay terminal indication to the radio terminal that has been selected as the relay radio terminal candidate. In this example, the D2D communication control apparatus 10 selects the radio terminal 22 and the radio terminal 23 as the relay radio terminal candidates and transmits the relay terminal indication to the radio terminal 23 and the radio terminal 22 in Steps S68 and S69.

Figure 10:
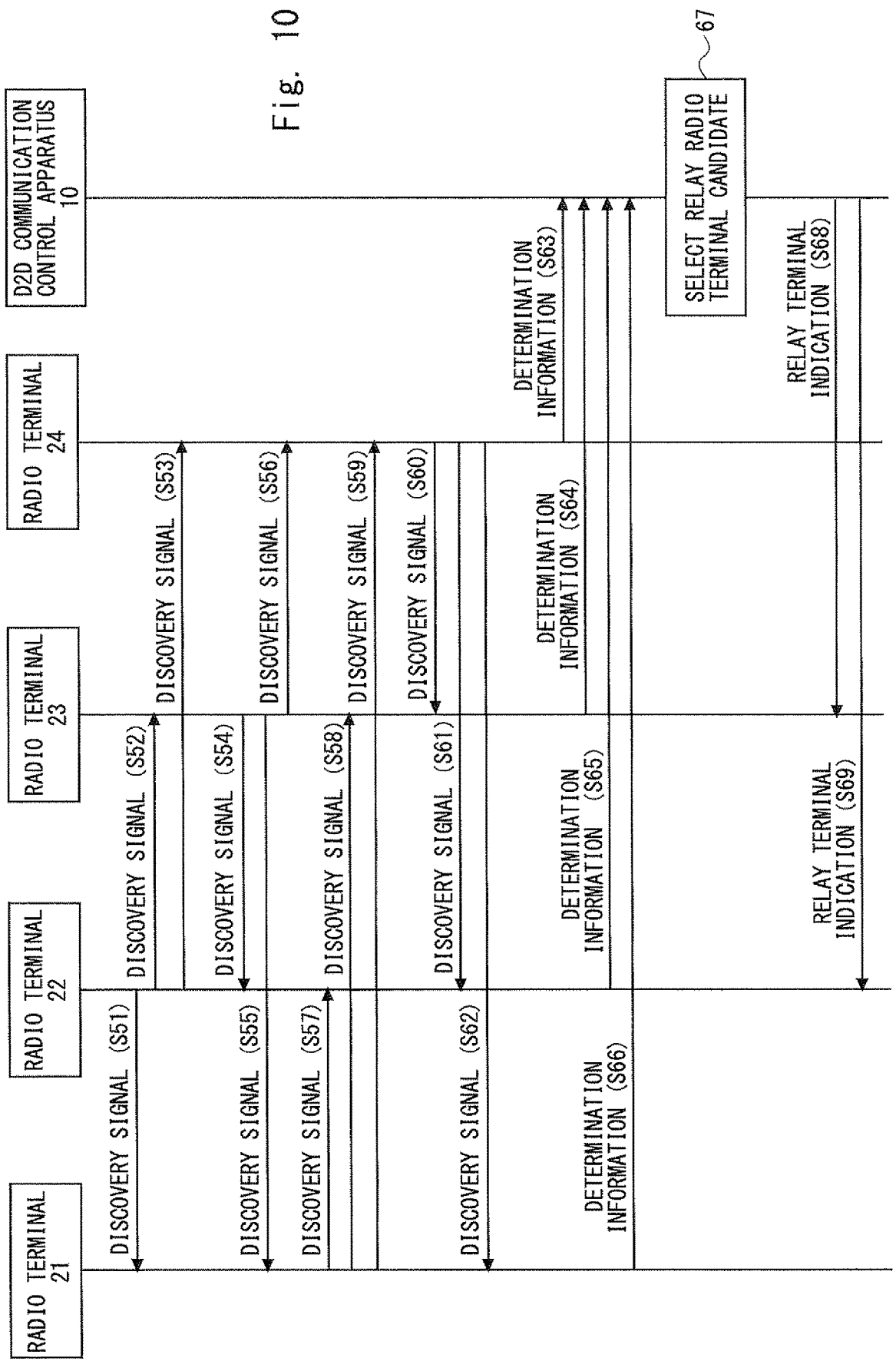
FIG. 10 is a diagram showing a sequence of processing for selecting a relay radio terminal candidate according to the second embodiment.

While data transmission and data reception between the radio terminals 21-24 and the D2D communication control apparatus 10 are performed via the base station 40 and the core network 30, the base station 40 and the core network 30 are not shown in FIG. 10.

As described above, by using the communication system according to the second embodiment of the present invention, in the D2D communication control apparatus 10, the relay terminal indication is transmitted to the radio terminal that has been selected as the relay radio terminal candidate via the core network 30 and the base station 40. Accordingly, the radio terminal that has received the relay terminal indication recognizes that it is the relay radio terminal candidate and transmits the response signal in response to the relay terminal request transmitted from another radio terminal. On the other hand, the radio terminal that has not received the relay terminal indication recognizes that it is not the relay radio terminal candidate and does not transmit the response signal in response to the relay terminal request transmitted from another radio terminal. Accordingly, the number of response signals transmitted to the radio terminal that has transmitted the relay terminal request becomes smaller than that in the case in which all the radio terminals that have received the relay terminal request transmit the response signals. It is therefore possible to reduce the interference that occurs between the response signals.

Further, the D2D communication control apparatus 10 may select the common relay radio terminal candidate in the cell 41 or may select the relay radio terminal candidate for each radio terminal located in the cell 41. Accordingly, the radio terminals located in the cell 41 are each able to reliably transmit the discovery signal to one of the relay radio terminal candidates. Further, when the relay radio terminal candidate is selected for each radio terminal, the number of relay radio terminal candidates can be reduced more than that in the case in which the common relay radio terminal candidate is selected in the cell 41. Accordingly, when the relay radio terminal candidate is selected for each radio terminal, it is possible to further reduce the occurrence of the interference between the response signals.

Third Embodiment

Figure 11:
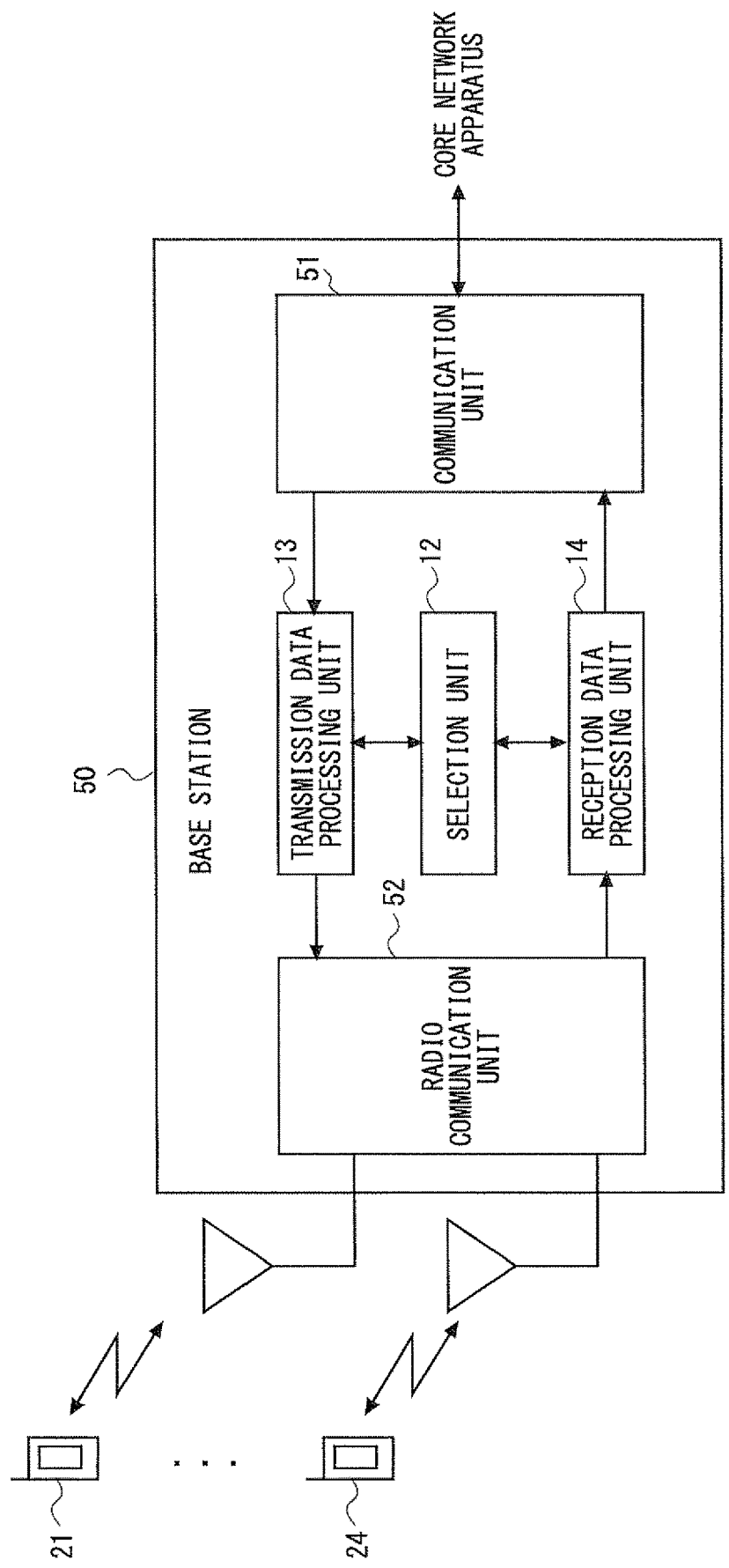
FIG. 11 is a configuration diagram of a D2D communication control apparatus according to a third embodiment.

Next, with reference to FIG. 11, a configuration example of a base station 50 according to a third embodiment of the present invention will be explained. The base station 50 includes the selection unit 12, the transmission data processing unit 13, the reception data processing unit 14, a communication unit 51, and a radio communication unit 52. Since the selection unit 12, the transmission data processing unit 13, and the reception data processing unit 14 execute the functions or the processing similar to those of the selection unit 12, the transmission data processing unit 13, and the reception data processing unit 14 in FIG. 3, the detailed descriptions thereof will be omitted.

The communication unit 51 communicates with the core network apparatus arranged in the core network 30. The radio communication unit 52 performs radio communication with the radio terminals 21-24 and the like located in the cell that the base station 50 forms. The reception data processing unit 14 receives the determination information transmitted from the radio terminals 21-24 via the radio communication unit 52. The reception data processing unit 14 outputs the determination information that has been received to the selection unit 12.

The selection unit 12 selects the relay radio terminal candidate using the determination information received from the reception data processing unit 14. The transmission data processing unit 13 transmits, to the radio terminal that has been selected by the selection unit 12 to be the relay radio terminal candidate, the relay terminal indication that notifies that this radio terminal is the relay radio terminal candidate.

Figure 3:
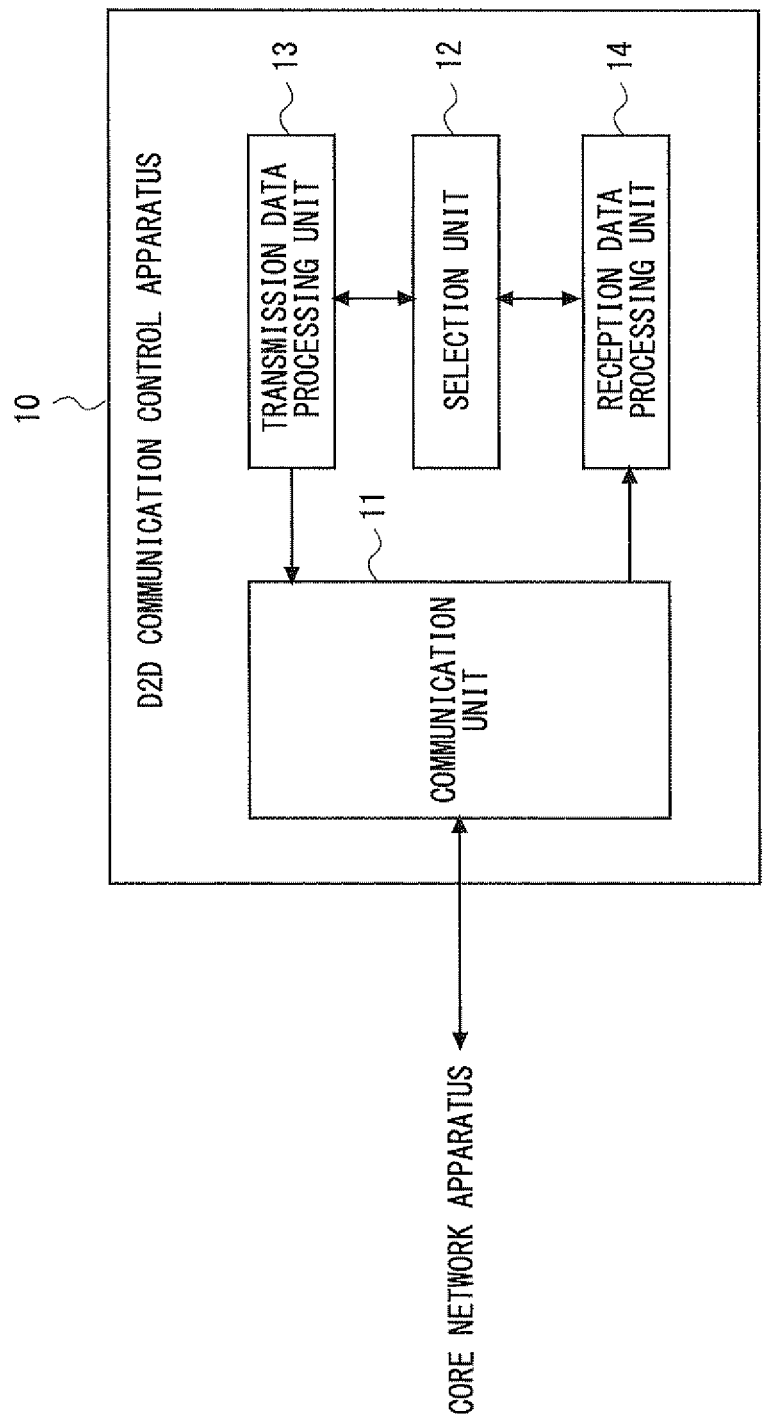
FIG. 3 is a configuration diagram of a D2D communication control apparatus according to the second embodiment.

As described above, the base station 50 includes the selection unit 12 included in the D2D communication control apparatus 10 in FIG. 3. Therefore, the base station 50 is able to select the relay radio terminal candidate using the determination information transmitted from the radio terminals 21-24. Accordingly, the determination information and the relay terminal indication are not communicated between the base station 50 and the D2D communication control apparatus 10 any more or the amount of the determination information and the number of relay terminal indications to be communicated are reduced. It is therefore possible to reduce the amount of traffic in the core network 30.

Fourth Embodiment

Figure 12:
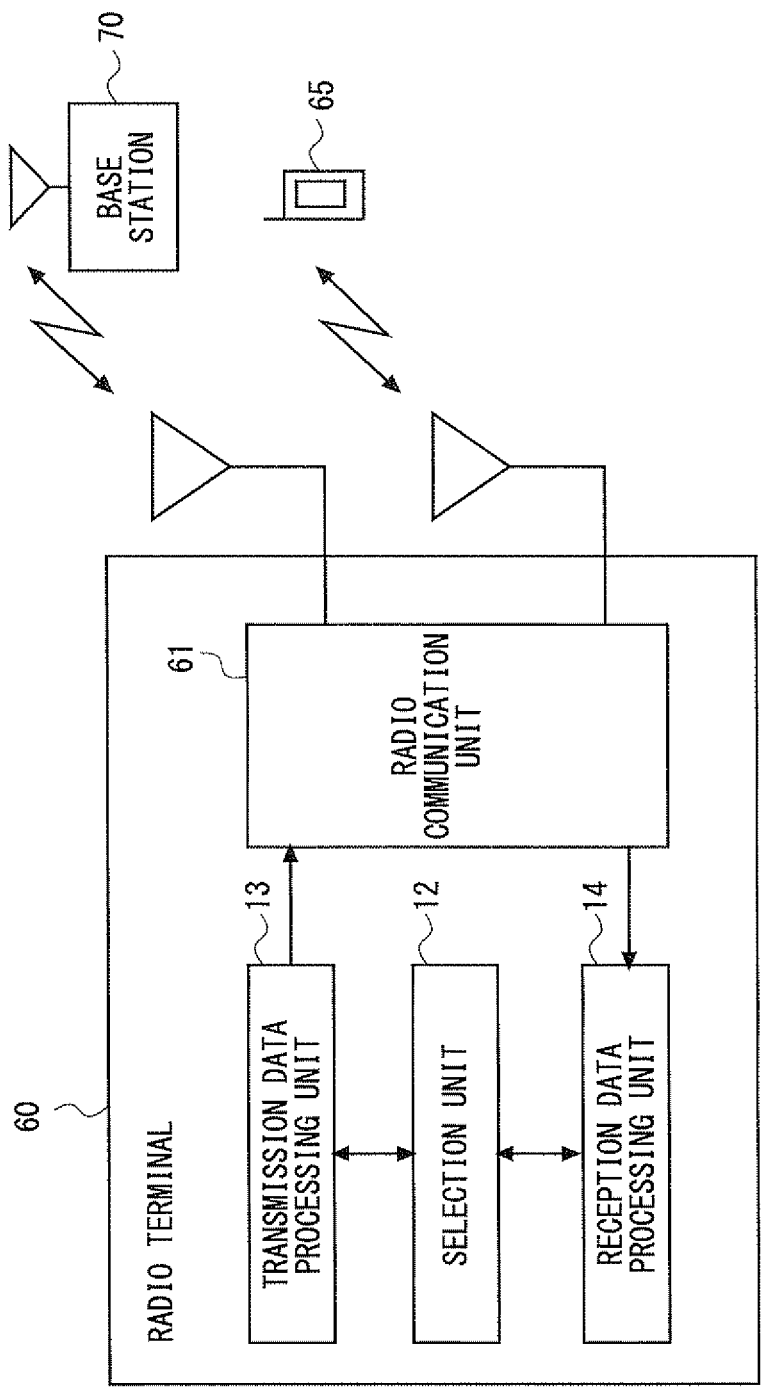
FIG. 12 is a configuration diagram of a D2D communication control apparatus according to a fourth embodiment.

Next, with reference to FIG. 12, a configuration example of a radio terminal 60 according to a fourth embodiment of the present invention will be explained. The radio terminal 60 includes the selection unit 12, the transmission data processing unit 13, the reception data processing unit 14, and a radio communication unit 61. Since the selection unit 12, the transmission data processing unit 13, and the reception data processing unit 14 execute functions or processing similar to those of the selection unit 12, the transmission data processing unit 13, and the reception data processing unit 14 in FIG. 3, the detailed descriptions thereof will be omitted.

The radio communication unit 61 performs radio communication with a base station 70 and performs D2D communication with a nearby radio terminal 65 and the like. The reception data processing unit 14 may receive the determination information from another radio terminal by performing D2D communication. Alternatively, the reception data processing unit 14 may receive the determination information from another radio terminal via the base station 70. The reception data processing unit 14 outputs the determination information that has been received to the selection unit 12.

The selection unit 12 selects the relay radio terminal candidate using the determination information received from the reception data processing unit 14. The transmission data processing unit 13 transmits, to the radio terminal that has been selected by the selection unit 12 to be the relay radio terminal candidate, the relay terminal indication for notifying that this radio terminal is the relay radio terminal candidate. The transmission data processing unit 13 may transmit the relay terminal indication to the radio terminal that has been selected as the relay radio terminal candidate by performing D2D communication using the radio communication unit 61. Alternatively, the transmission data processing unit 13 may transmit the relay terminal indication to the radio terminal that has been selected as the relay radio terminal candidate via the base station 70 using the radio communication unit 61.

As described above, the radio terminal 60 includes the selection unit 12 included in the D2D communication control apparatus 10 shown in FIG. 3. Therefore, the radio terminal 60 is able to select the relay radio terminal candidate using the determination information transmitted from another radio terminal. In this case, the radio terminal 60 may receive the determination information via the base station 70 or may receive the determination information by another radio terminal by performing D2D communication. Further, the radio terminal 60 that collects the determination information may be arbitrarily determined from among the plurality of radio terminals located in the cell. Alternatively, the radio terminal 60 that collects the determination information may be defined, for example, using a specific criterion such as the radio terminal in which the number of discovery terminal elements is the largest. The radio terminal 60 that collects the determination information may be defined by the D2D communication control apparatus 10 or may be specified by an administrator or the like.

Figure 13:
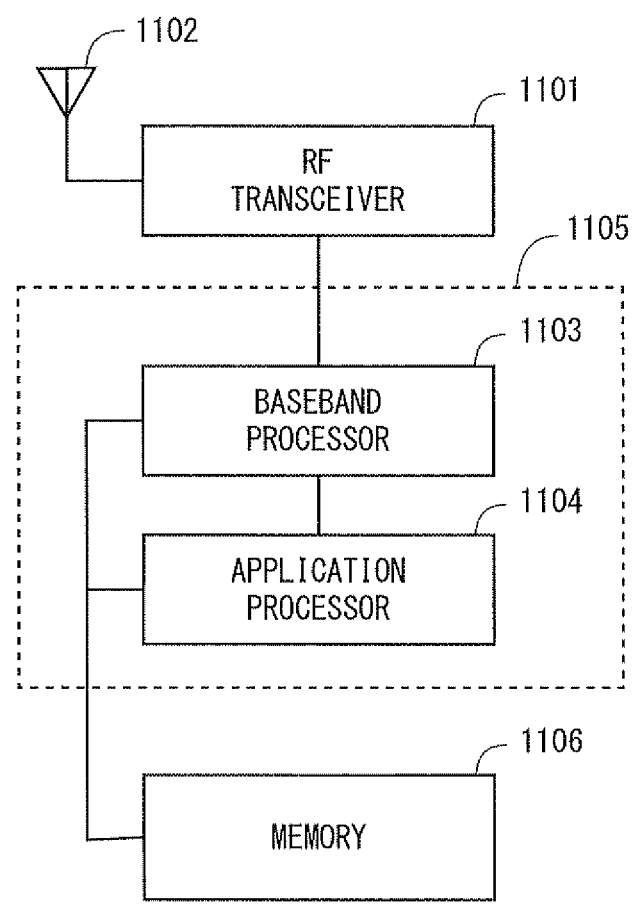
FIG. 13 is a block diagram showing a configuration example of a radio terminal according to several embodiments.

Lastly, configuration examples of the radio terminal 21, the base station 40, and the D2D communication control apparatus 10 according to the aforementioned embodiments will be described. FIG. 13 is a block diagram showing a configuration example of the radio terminal 21. A Radio Frequency (RF) transceiver 1101 performs analog RF signal processing to communicate with the base station 40. The analog RF signal processing performed by the RF transceiver 1101 includes frequency up-conversion, frequency down-conversion, and amplification. The RF transceiver 1101 is coupled to an antenna 1102 and a baseband processor 1103. That is, the RF transceiver 1101 receives modulated symbol data (or OFDM symbol data) from the baseband processor 1103, generates a transmission RF signal, and supplies the transmission RF signal to the antenna 1102. Further, the RF transceiver 1101 generates a baseband reception signal based on a reception RF signal received by the antenna 1102, and supplies the baseband reception signal to the baseband processor 1103.

The baseband processor 1103 performs digital baseband signal processing (i.e., data plane processing) and control plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). On the other hand, the control plane processing includes communication management of layer 1 (e.g., transmission power control), layer 2 (e.g., radio resource management and hybrid automatic repeat request (HARQ) processing), and layer 3 (e.g., signalling regarding attach, mobility, and call management).

In the case of LTE and LTE-Advanced, the digital baseband signal processing performed by the baseband processor 1103 may include signal processing of a Packet Data Convergence Protocol (PDCP) layer, a Radio Link Control (RLC) layer, a MAC layer, and a PHY layer. Further, the control plane processing performed by the baseband processor 1103 may include processing of a Non-Access Stratum (NAS) protocol, an RRC protocol, and MAC CE.

The baseband processor 1103 may include a modem processor (e.g., a Digital Signal Processor (DSP)) that performs the digital baseband signal processing and a protocol stack processor (e.g., a Central Processing Unit (CPU) or a Micro Processing Unit (MPU)) that performs the control plane processing. In this case, the protocol stack processor, which performs control plane processing, may be integrated with an application processor 1104 described below.

The application processor 1104 is also referred to as a CPU, an MPU, a microprocessor, or a processor core. The application processor 1104 may include a plurality of processors (processor cores). The application processor 1104 loads a system software program (Operating System (OS)) and various application programs (e.g., a voice call application, a WEB browser, a mailer, a camera operation application, and a music player application) from a memory 1106 or from another memory (not shown) and executes these programs, thereby providing various functions of the radio terminal 21.

In some implementations, as represented by a dashed line (1105) in FIG. 13, the baseband processor 1103 and the application processor 1104 may be integrated on a single chip. In other words, the baseband processor 1103 and the application processor 1104 may be implemented in a single System on Chip (SoC) device 1105. An SoC device may be referred to as a system Large Scale Integration (LSI) or a chipset.

The memory 1106 is a volatile memory, a non-volatile memory, or a combination thereof. The memory 1106 may include a plurality of memory devices that are physically independent from each other. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 1106 may include, for example, an external memory device that can be accessed from the baseband processor 1103, the application processor 1104, and the SoC 1105. The memory 1106 may include, for example, an internal memory device that is integrated in the baseband processor 1103, the application processor 1104, or the SoC 1105. Further, the memory 1106 may include a memory in a Universal Integrated Circuit Card (UICC).

The memory 1106 may store software modules (computer programs) including instructions and data for performing the processing by the radio terminal 21 described in the aforementioned embodiments. In some implementations, the baseband processor 1103 or the application processor 1104 may load the software modules from the memory 1106 and execute these loaded software modules, thereby performing the processing of the radio terminal 21 described with reference to the sequence diagrams and the flowcharts in the aforementioned embodiments.

Figure 14:
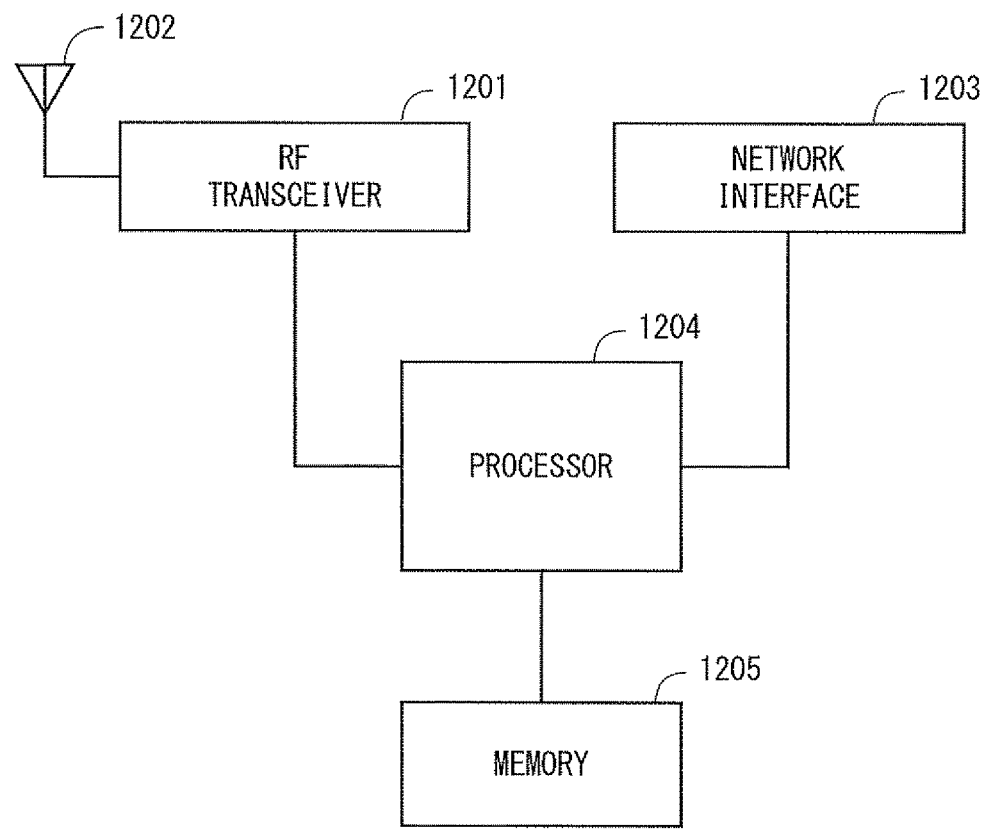
FIG. 14 is a block diagram showing a configuration example of a base station according to several embodiments.

FIG. 14 is a block diagram showing a configuration example of the base station 40 according to the aforementioned embodiments. Referring to FIG. 12, the base station 40 includes an RF transceiver 1201, a network interface 1203, a processor 1204, and a memory 1205. The RF transceiver 1201 performs analog RF signal processing in order to communicate with the radio terminal 21. The RF transceiver 1201 may include a plurality of transceivers. The RF transceiver 1201 is coupled to an antenna 1202 and the processor 1204. The RF transceiver 1201 receives modulated symbol data (or OFDM symbol data) from the processor 1204, generates a transmission RF signal, and supplies the transmission RF signal to the antenna 1202. Further, the RF transceiver 1201 generates a baseband reception signal based on a reception RF signal received by the antenna 1202, and supplies the baseband reception signal to the processor 1204.

The network interface 1203 is used to communicate with a network node (e.g., Mobility Management Entity (MME) and a Serving Gateway (S-GW)). The network interface 1203 may include, for example, a network interface card (NIC) conforming to the IEEE 802.3 series.

The processor 1204 performs digital baseband signal processing (data plane processing) and control plane processing for radio communication. In the case of LTE and LTE-Advanced, for example, the digital baseband signal processing performed by the processor 1204 may include signal processing of the PDCP layer, the RLC layer, the MAC layer, and the PHY layer. Further, the control plane processing performed by the processor 1204 may include processing of the 51 protocol, the RRC protocol, and MAC CE.

The processor 1204 may include a plurality of processors. The processor 1204 may include, for example, a modem processor (e.g., a DSP) that performs the digital baseband signal processing and a protocol stack processor (e.g., a CPU or an MPU) that performs the control plane processing.

The memory 1205 is composed of a combination of a volatile memory and a non-volatile memory. The volatile memory is, for example, an SRAM, a DRAM, or a combination thereof. The non-volatile memory is, for example, an MROM, a PROM, a flash memory, a hard disc drive, or a combination thereof. The memory 1205 may include a storage that is spaced apart from the processor 1204. In this case, the processor 1204 may access the memory 1205 via the network interface 1203 or an I/O interface (not shown).

The memory 1205 may store software modules (computer programs) including instructions and data for performing processing by the base station 40 described in the aforementioned embodiments. In some implementations, the processor 1204 may load these software modules from the memory 1205 and execute these loaded software modules, thereby performing processing of the base station 40 described with reference to the sequence diagrams and the flowcharts in the aforementioned embodiments.

Figure 15:
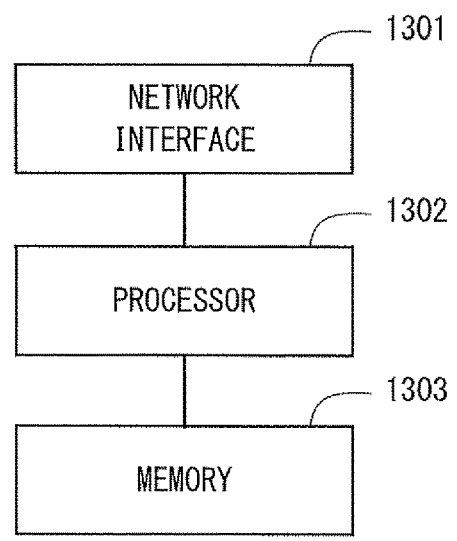
FIG. 15 is a block diagram showing a configuration example of a D2D communication control apparatus according to several embodiments.

FIG. 15 is a block diagram showing a configuration example of the D2D communication control apparatus 10 according to the aforementioned embodiments. Referring to FIG. 15, the D2D communication control apparatus 10 includes a network interface 1301, a processor 1302, and a memory 1303. The network interface 1301 is used to communicate with the radio terminal 21. The network interface 1301 may include, for example, a network interface card (NIC) conforming to the IEEE 802.3 series.

The processor 1302 loads software (computer program) from the memory 1303 and executes the loaded software, thereby performing the processing of the D2D communication control apparatus 10 described with reference to the sequence diagrams and flowcharts in the aforementioned embodiments. The processor 1302 may include, for example, a microprocessor, an MPU, or a CPU. The processor 1302 may include a plurality of processors.

The memory 1303 is composed of a combination of a volatile memory and a non-volatile memory. The memory 1303 may include a storage spaced apart from the processor 1302. In this case, the processor 1302 may access the memory 1303 via an I/O interface (not shown).

In the example shown in FIG. 15, the memory 1303 is used to store software modules including a control module for D2D communication. The processor 1302 loads these software modules from the memory 1303 and executes these loaded software modules, thereby performing the processing of the D2D communication control apparatus 10 described in the aforementioned embodiments.

As described above with reference to FIGS. 13 to 15, each of the processors included in the radio terminal 21, the base station 40, and the D2D communication control apparatus 10 according to the aforementioned embodiments executes one or more programs including instructions to cause a computer to perform an algorithm described with reference to the drawings. The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Further, the aforementioned embodiments may be executed independently from each other or may be combined with each other as appropriate.

Note that the present invention is not limited to the aforementioned embodiments and may be changed as appropriate without departing from the spirit of the present invention.

While the present invention has been described above with reference to the embodiments, the present invention is not limited to the aforementioned embodiments. Various changes that may be understood by those skilled in the art within the scope of the invention may be made to the configurations and the details of the present invention.

REFERENCE SIGNS LIST

10 D2D COMMUNICATION CONTROL APPARATUS
11 COMMUNICATION UNIT
12 SELECTION UNIT
13 TRANSMISSION DATA PROCESSING UNIT
14 RECEPTION DATA PROCESSING UNIT
21 RADIO TERMINAL
22 RADIO TERMINAL
23 RADIO TERMINAL
24 RADIO TERMINAL
30 CORE NETWORK
40 BASE STATION
41 CELL
42 COVERAGE HOLE
50 BASE STATION
51 COMMUNICATION UNIT
52 RADIO COMMUNICATION UNIT
60 RADIO TERMINAL
61 RADIO COMMUNICATION UNIT
65 RADIO TERMINAL
70 BASE STATION

The invention claimed is:
1. A D2D communication control apparatus comprising:
at least one memory storing instructions, and
at least one processor configured to execute the instructions to;
receive determination information that can be used to determine whether each of a plurality of radio terminals is capable of performing direct communication (device-to-device (D2D) communication) with another radio terminal, the determination information is information on a result of receiving a first discovery signal transmitted from one of the radio terminals by performing D2D communication with another of the plurality of radio terminals; and select, using the determination information between radio terminals that may operate as relay radio terminals, a candidate for a relay radio terminal that relays the communication between one of the plurality of radio terminals and a network, the relay radio terminal candidate transmitting a response signal in response to the first discovery signal and performing cellular communication with the network, wherein the determination information comprises at least one of positional information generated by each of the plurality of radio terminals and reception result information indicating a result of receiving a second discovery signal that each of the plurality of radio terminals has received from another radio terminal, wherein the reception result information comprises at least one of identification information on the radio terminal that has transmitted the second discovery signal, information on the reception power of the second discovery signal, and information on the number of times the second discovery signal has been received, and wherein the at least one processor is further configured to execute the instructions to select the relay radio terminal candidate using information regarding the number of pieces of identification information on the radio terminal that has transmitted the second discovery signal.

2. The D2D communication control apparatus according to claim 1, wherein the at least one processor is further configured to execute the instructions to transmit, to the relay radio terminal candidate selected by the selection means, an indication signal indicating that it is the relay radio terminal candidate.

3. The D2D communication control apparatus according to claim 2, wherein the indication signal comprises information regarding a timing when the response signal is transmitted.

4. The D2D communication control apparatus according to claim 3, wherein information regarding the timing when the response signal is transmitted comprises at least one of an offset value from the timing when the first discovery signal is received to the timing when the response signal is transmitted and information regarding a subframe number at which transmission of the response signal is permitted.

5. The D2D communication control apparatus according to claim 1, wherein the at least one processor is further configured to execute the instructions to select, as the relay radio terminal candidate, a radio terminal that has transmitted the reception result information indicating that the number of pieces of identification information on the radio terminal that has transmitted the second discovery signal is equal to or smaller than a threshold.

6. A radio terminal comprising:
at least one memory storing instructions, and
at least one processor configured to execute the instructions to;
receive determination information that can be used to determine whether each of a plurality of other radio terminals is capable of performing device-to-device (D2D) communication with another radio terminal, the determination information is information on a result of receiving a first discovery signal transmitted from one of the radio terminals by performing D2D communication with another of the plurality of radio terminals; and select, using the determination information between radio terminals that may operate as relay radio terminals, a candidate for a relay radio terminal that relays the communication between one of the plurality of radio terminals and a network, the relay radio terminal candidate transmitting a response signal in response to the first discovery signal and performing cellular communication with the network, wherein the determination information comprises at least one of positional information generated by each of the plurality of other radio terminals and reception result information indicating a result of receiving a second discovery signal that each of the plurality of radio terminals has received from a radio terminal, and wherein the reception result information comprises at least one of identification information on the radio terminal that has transmitted the second discovery signal, information on the reception power of the second discovery signal, and information on the number of times the second discovery signal has been received.

7. The radio terminal according to claim 6, wherein the at least one processor is further configured to execute the instructions to transmit, to the relay radio terminal candidate selected by the selection means, an indication signal indicating that it is the relay radio terminal candidate.

8. The radio terminal according to claim 7, wherein the indication signal comprises information regarding a timing when the response signal is transmitted.

9. The radio terminal according to claim 8, wherein information regarding the timing when the response signal is transmitted comprises at least one of an offset value from the timing when the first discovery signal is received to the timing when the response signal is transmitted and information regarding a subframe number at which transmission of the response signal is permitted.

10. The radio terminal according to claim 6, wherein the at least one processor is further configured to execute the instructions to select the relay radio terminal candidate using information regarding the number of pieces of identification information on the radio terminal that has transmitted the second discovery signal.

11. A relay radio terminal candidate selection method comprising:
receiving determination information that can be used to determine whether each of a plurality of radio terminals is capable of performing device-to-device (D2D) communication with another radio terminal, the determination information is information on a result of receiving a first discovery signal transmitted from one of the radio terminals by performing D2D communication with another of the plurality of radio terminals; and selecting, using the determination information between radio terminals that may operate as relay radio terminals, a candidate for a relay radio terminal that relays the communication between one of the plurality of radio terminals and a network, the relay radio terminal candidate transmitting a response signal in response to the first discovery signal and performing cellular communication with the network, wherein the determination information comprises at least one of positional information generated by each of the plurality of radio terminals and reception result information indicating a result of receiving a second discovery signal that each of the plurality of radio terminals has received from another radio terminal, wherein the reception result information comprises at least one of identification information on the radio terminal that has transmitted the second discovery signal, information on the reception power of the second discovery signal, and information on the number of times the second discovery signal has been received.

* * * * *

UNITED STATES PATENT AND TRADEMARK OFFICE
CERTIFICATE OF CORRECTION

PATENT NO. : 10,778,324 B2
APPLICATION NO. : 15/736165
DATED : September 15, 2020
INVENTOR(S) : Hiroaki Aminaka, Kazushi Muraoka and Taichi Ohtsuji It is certified that error appears in the above-identified patent and that said Letters Patent is hereby corrected as shown below:

In the Specification

Column 19, Description of Embodiments, Line 11; Delete "51" and insert --S1-- therefor Signed and Sealed this
Twenty-ninth Day of December, 2020

Andrei Iancu
*Director of the United States Patent and Trademark Office*